(12) United States Patent
Morris et al.

(10) Patent No.: US 8,238,473 B2
(45) Date of Patent: Aug. 7, 2012

(54) SELECTIVE PEAK POWER REDUCTION

(75) Inventors: Bradley John Morris, Ottawa (CA);
Arthur Thomas Gerald Fuller, Carp (CA)

(73) Assignee: Research In Motion Limited, Ontario (CA)

( * ) Notice: Subject to any disclaimer, the term of this patent is extended or adjusted under 35 U.S.C. 154(b) by 0 days.

(21) Appl. No.: 13/291,481

(22) Filed: Nov. 8, 2011

(65) Prior Publication Data

US 2012/0057654 A1    Mar. 8, 2012

Related U.S. Application Data

(63) Continuation of application No. 12/337,444, filed on Dec. 17, 2008, now Pat. No. 8,068,558.

(51) Int. Cl.
*H04K 1/02* (2006.01)

(52) U.S. Cl. ...................................................... 375/296

(58) Field of Classification Search .................. 375/296, 375/297
See application file for complete search history.

(56) References Cited

U.S. PATENT DOCUMENTS

| | | | |
|---|---|---|---|
| 6,236,864 B1 | 5/2001 | McGowan et al. | |
| 6,687,511 B2 | 2/2004 | McGowan et al. | |
| 7,002,904 B2 | 2/2006 | Jung | |
| 7,013,161 B2 | 3/2006 | Morris | |
| 7,292,639 B1 | 11/2007 | Demirekler et al. | |
| 2004/0017859 A1* | 1/2004 | Sills et al. | 375/296 |
| 2004/0086054 A1 | 5/2004 | Corral | |
| 2007/0140101 A1 | 6/2007 | Guo et al. | |
| 2008/0089437 A1 | 4/2008 | Frederiksen et al. | |
| 2009/0092195 A1 | 4/2009 | Guo et al. | |

FOREIGN PATENT DOCUMENTS

| | | |
|---|---|---|
| EP | 1469649 A1 | 10/2004 |
| WO | 2009043172 A1 | 4/2009 |

OTHER PUBLICATIONS

Han et al., "An Overview of Peak to Average Power Ratio Reduction Techniques for Multicarrier Transmission," Modulation, Coding and Signal Processing for Wireless Communications, IEEE Wireless Communications, Apr. 2005, pp. 56-65.
International Search Report for PCT/IB2009/007649 mailed Sep. 2, 2010, 7 pages.
Notice of Allowance for U.S. Appl. No. 12/337,444 mailed Jul. 13, 2011, 9 pages.

* cited by examiner

*Primary Examiner* — Kevin Kim
(74) *Attorney, Agent, or Firm* — Winthrow & Terranova, P.L.L.C.

(57) ABSTRACT

The present invention provides a technique for reducing the peak power of a combined signal that has a first signal of a first modulation type and a second signal of a second modulation type. Based on the combined signal, peak reduction distortion is determined. The peak reduction distortion is configured such that, if applied to the entirety of the combined signal, excessive peaks throughout the combined signal would be reduced. However, instead of applying the entirety of the peak reduction distortion, a selected portion of the peak reduction distortion is applied to a corresponding portion of the combined signal to reduce the peak power of the combined signal.

20 Claims, 7 Drawing Sheets

SPECTRUM OF COMBINED INPUT SIGNAL (A)

SPECTRUM OF PEAKS SIGNAL (C)

TRANSFER FUNCTION OF DISTORTION SELECTION FILTER

SPECTRUM OF SELECTIVE DISTORTION SIGNAL

SELECTIVE PEAK POWER REDUCTION

RELATED APPLICATIONS

The present application is a continuation of co-pending U.S. patent application Ser. No. 12/337,444, filed Dec. 17, 2008, entitled "SELECTIVE PEAK POWER REDUCTION."

FIELD OF THE INVENTION

The present invention relates to peak power reduction and in particular to selective peak power reduction.

BACKGROUND OF THE INVENTION

A peak-to-average power ratio (PAPR) is a measure of instantaneous peak power relative to the average power being supplied by a power amplifier when amplifying a given input signal to provide an amplified output signal. The PAPR has an impact on amplifier efficiency, which is invariably an important attribute of portable communication systems that rely on battery power. More efficient amplifiers require less energy to amplify a given signal to a certain level than less efficient amplifiers. Generally, a lower PAPR enables a higher amplifier efficiency, whereas a higher PAPR results in lower amplifier efficiency. Accordingly, designers are constantly trying to build more efficient communication systems that result in lower PAPRs.

The PAPR for communication systems is typically a function of the input signal being amplified by the power amplifier. The peak and average amplitudes of the input signal correlate to the instantaneous peak and average powers provided by the power amplifier while amplifying the input signal. As such, an input signal that has relatively high instantaneous peaks in amplitude with respect to the overall average amplitude is considered a high PAPR signal, whereas an input signal that has relatively low instantaneous peaks in amplitude with respect to the overall average amplitude is considered a low PAPR signal. The peak and average amplitudes of the input signal are often a function of how the input signal is modulated.

Typical modulation schemes employed in modern communication systems include frequency division multiple access (FDMA), including orthogonal frequency division multiple access (OFDM); code division multiple access (CDMA); and time division multiple access (TDMA) schemes. OFDM systems, such as the Third Generation Partnership Project's (3GPP's) Long Term Evolution (LTE) standard and the World Wide Interoperability for Microwave Access (WiMAX) standard, employ a number of independently modulated subcarriers, which can result in high PAPRs. CDMA systems, such as the Universal Mobile Telecommunications Systems (UMTS), employ spread spectrum modulation and are also considered to have high PAPRs, similar to OFDM systems. TDMA systems, such as Global System for Mobile Communications (GSM) employ a constant power envelope, and as such, have very low PAPRs. Enhanced Data Rates for GSM Evolution (EDGE) is non-constant envelope and generally lies between GSM and CDMA/OFDM systems with respect to PAPR. For systems that have relatively high PAPRs, techniques have been employed to reduce the peak amplitude of the modulated input signal prior to amplification in an effort to reduce the associated PAPR, and as a result, may increase the efficiency of the power amplifier.

An exemplary PAPR reduction technique involves distorting a given input signal, which is only modulated according to a single modulation scheme, to effectively reduce those peaks that exceed a given threshold. Prior to amplification, the peaks of the input signal that exceed the given threshold are removed, or clipped, to form a clipped signal. The clipped signal is subtracted from the input signal to form a distortion signal, which is subsequently processed and applied to the entirety of the input signal to result in peak reduction. Application of the attenuated distortion signal to the input signal effectively reduces those peaks that exceed the given threshold by a desired amount. This and other PAPR reduction techniques have proven relatively successful when applied to signals that are only modulated according to a single modulation scheme.

However, certain communication systems are now being required to process signals using different modulation schemes at the same time. With the evolution from second generation (2G/2.5G) and third generation (3G) networks that rely on CDMA and TDMA schemes to fourth generation (4G) networks that rely on OFDM schemes, communication systems often need to simultaneously support a combination of CDMA and OFDM schemes, TDMA and OFDM schemes, or perhaps CDMA, TDMA, and OFDM schemes. Unfortunately, when the different signals from different modulation schemes are combined, the PAPR associated with the combined input signal can significantly increase. Even if corresponding PAPR reduction techniques are individually applied to each of the different signals before the respective signals are combined, the combined input signal will still have an undesirable PAPR. This is particularly the case when an OFDM signal is combined with a TDMA or CDMA signal. Further, application of existing PAPR techniques to such a combined signal have proven ineffective, primarily because the different types of signals in the combined signal require different PAPR techniques, or one type of signal is intolerant to the PAPR techniques required by another type of signal.

Accordingly, there is a need for an effective and efficient technique to reduce the PAPR associated with a combined signal that includes two or more signals that were generated using different modulation schemes.

SUMMARY OF THE INVENTION

The present invention provides a technique for reducing the peak power of a combined signal that has a first signal of a first modulation type and a second signal of a second modulation type. Based on the combined signal, peak reduction distortion is determined. The peak reduction distortion is configured such that, if applied to the entirety of the combined signal, excessive peaks throughout the combined signal would be reduced. However, instead of applying the entirety of the peak reduction distortion, a selected portion of the peak reduction distortion is applied to a corresponding portion of the combined signal to reduce the peak power of the combined signal.

In one embodiment, the first signal resides in a first frequency band and the second signal resides in a second frequency band of the combined signal. The first frequency band is spaced apart from the second frequency band. Peak reduction distortion for the combined signal is generated based on peaks that exceed a given threshold within the overall combined signal. As such, the peak reduction distortion has spectral components in at least the first frequency band and the second frequency band. Those spectral components that are within the first frequency band are selected from the peak reduction distortion and represent the selected portion of the peak reduction distortion. The selected portion of the peak reduction distortion is applied to the combined signal in the first frequency band to effectively reduce those peaks in the combined signal that exceed the given threshold. If the spectral components in the second frequency band of the peak reduction distortion are not applied, or at most minimally applied, to the combined signal in the second frequency band, the second signal is at most minimally impacted.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

Figure 1:
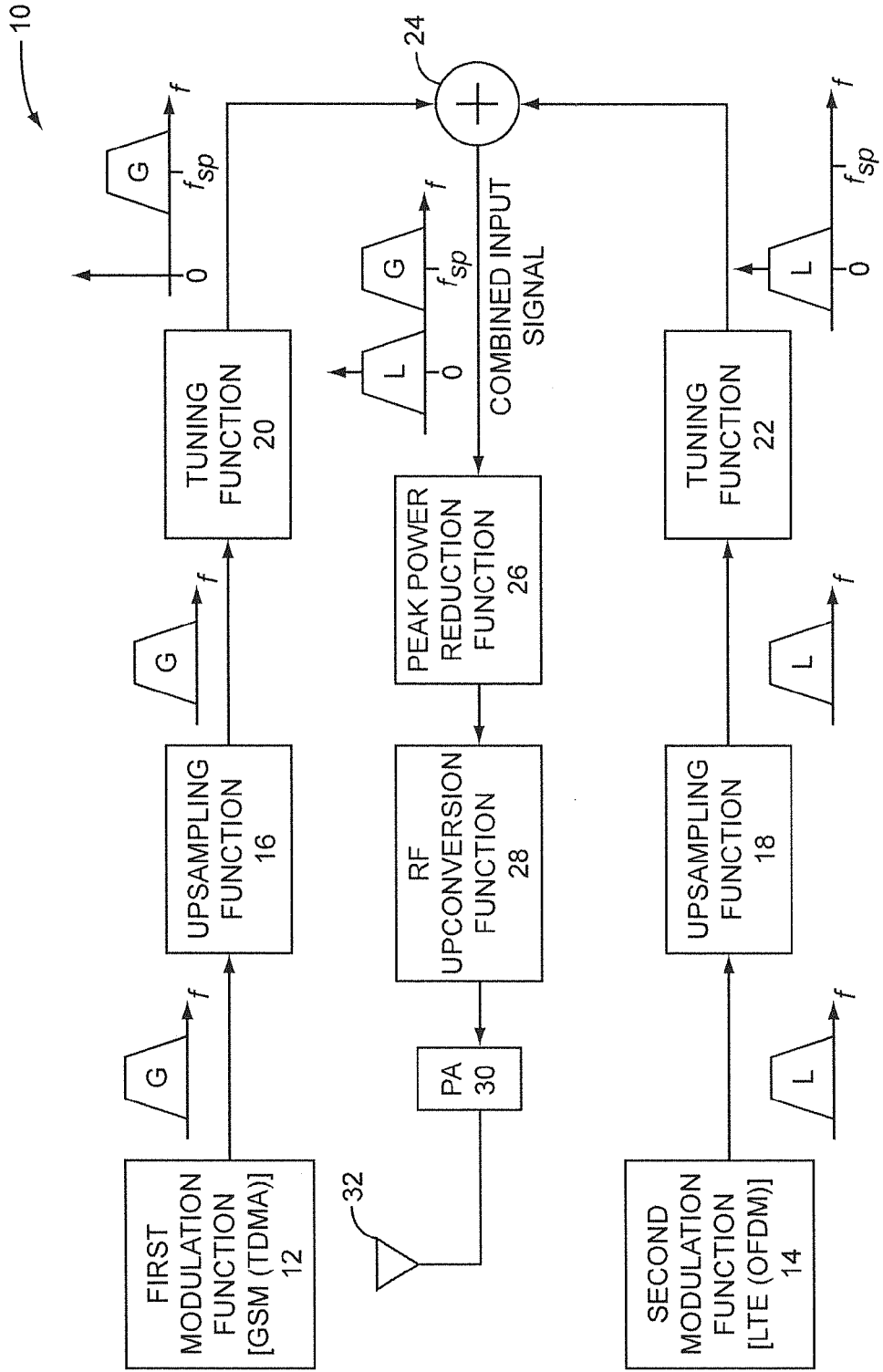
FIG. 1 is a block representation of a transmission path of a communication device according to one embodiment of the present invention.

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a technique for reducing the peak power of a combined signal that has a first signal of a first modulation type and a second signal of a second modulation type. Based on the combined signal, peak reduction distortion is determined. The peak reduction distortion is configured such that, when applied to the entirety of the combined signal, excessive peaks throughout the combined signal would be reduced. Instead of applying the entirety of the peak reduction distortion, a selected portion of the peak reduction distortion is applied to a corresponding portion of the combined signal to reduce the peak power of the combined signal.

In one embodiment, the first signal resides in a first frequency band and the second signal resides in a second frequency band of the combined signal. The first frequency band is spaced apart from the second frequency band. Peak reduction distortion for the combined signal is generated based on peaks that exceed a given threshold within the overall combined signal. As such, the peak reduction distortion has spectral components in at least the first frequency band and the second frequency band. Those spectral components that are within the first frequency band are selected from the peak reduction distortion and represent the selected portion of the peak reduction distortion. The selected portion of the peak reduction distortion is applied to the combined signal in the first frequency band to effectively reduce those peaks that are in the combined signal and exceed the given threshold. If the spectral components in the second frequency band of the peak reduction distortion are not applied, or at most minimally applied, to the combined signal in the second frequency band, the second signal is at most minimally impacted.

In most scenarios, the combined signal will have one signal that can tolerate application of peak reduction distortion better than the other. As such, it is preferable to selectively apply peak reduction distortion in a frequency band with the signal that can better tolerate the application of peak reduction distortion and not apply peak reduction distortion in a frequency band with a signal that is relatively unable to tolerate the application of peak reduction distortion. In the above embodiment, the first signal is more tolerant to receiving peak reduction distortion than the second signal. Accordingly, a corresponding portion of the peak reduction distortion is selectively applied to the first frequency band in which the first signal resides, while little or no corresponding peak reduction distortion is applied in the second frequency band in which the second signal resides.

For example, in communication systems that employ both TDMA based GSM and OFDM based LTE communication standards, the TDMA signals for GSM are generally considered less tolerant of peak reduction distortion than the OFDM signals for LTE. As such, the peak reduction distortion is selectively applied to the OFDM signals in the LTE frequency band while little or no peak reduction distortion is applied to the TDMA signals in the GSM frequency band. In communication systems that employ both CDMA and OFDM based LTE communication standards, the OFDM signals for LTE are generally considered less tolerant of peak reduction distortion than the CDMA signals. As such, the peak reduction distortion is selectively applied to the CDMA signals in the CDMA frequency band, while little or no peak reduction distortion is applied to the OFDM signals in the LTE frequency band. Alternatively, different levels of corresponding peak reduction distortion may be directed to the different signals in the respective frequency bands, instead of primarily applying corresponding peak reduction distortion to a given signal in a given frequency band.

With reference to FIG. 1, a transmission path for a communication device 10 is illustrated according to one embodiment of the present invention. The communication device 10 is capable of supporting different modulation schemes and combining signals from the different modulation schemes to form a combined signal, which is processed to reduce peak power, upconverted to an appropriate RF frequency, amplified, and transmitted in a desired fashion. Assume that through appropriate baseband circuitry, a first modulation function 12 and a second modulation function 14 are provided, wherein the first modulation function 12 is capable of modulating data according to a first modulation scheme, and the second modulation function 14 is capable of modulating data according to a second modulation scheme. Although any combination of modulation schemes may be provided, assume for the purposes of illustration only that the first modulation function 12 will provide a TDMA based GSM signal G, and the second modulation function 14 will provide an OFDM based LTE signal L. The GSM signal G and the LTE signal L are graphically represented in the frequency domain. It is assumed that the GSM signal G and the LTE signal L are initially digital signals and are provided at different sampling rates. Preferably, both the GSM signal G and the LTE signal L are upsampled by their respective upsampling functions 16, 18 to a common sampling rate sufficient to represent a combined input signal, which will be created by combining the GSM signal G and the LTE signal L. In this example, assume that the TDMA based GSM signals are less tolerant of peak reduction distortion than the OFDM based LTE signals, and as such, peak reduction distortion will be selectively applied to the OFDM signals in the LTE frequency band, while little or no peak reduction distortion will be applied to the TDMA signals in the GSM frequency band, once the combined input signal is generated.

Prior to combining the GSM signal G and the LTE signal L, the respective signals should be tuned to desired locations relative to one another. Although not required, the signals that will be receiving peak reduction distortion are preferably placed such that there is symmetry about 0 Hz (or baseband). Signals that will not be receiving distortion can be placed anywhere relative to 0 Hz or the signal that will be receiving the peak reduction distortion. If such tuning is required, the GSM signal G is tuned by a tuning function 20, while the LTE signal L is tuned by a tuning function 22.

Since the combined input signal will be upconverted to a radio frequency signal prior to transmission, the frequency spacing between the GSM and LTE signals G, L within the combined input signal will preferably correspond to the frequency spacing that is required between the first and second signals in the radio frequency signal. As such, the GSM and LTE signals G, L should be tuned to locations that are separated in frequency by the frequency spacing that is required in the radio frequency signal. In this example, assume the desired frequency spacing is $f_{sp}$. If the GSM signal G is located about 0 Hz, then the LTE signal should be tuned such that it is located about $f_{sp}$.

Once the GSM and LTE signals G, L are tuned to their appropriate locations, the respective signals may be combined through appropriate combining circuitry 24 to provide the combined input signal. Notably, the combined input signal includes the LTE signal L and the GSM signal G, wherein the LTE signal is centered about 0 Hz and the GSM signal is centered about the frequency $f_{sp}$. As such, the combined input signal is effectively a composite signal, wherein the LTE signal L and the GSM signal G are separated by a desired frequency spacing ($f_{sp}$). The combined input signal is processed by a peak power reduction function 26, as will be described in detail further below, to provide a combined output signal. The combined output signal is upconverted to an appropriate radio frequency by an RF upconversion function 28 and amplified by a power amplifier (PA) 30 before being transmitted via one or more antennas 32. Notably, the first and second modulation functions 12, 14, upsampling functions 16, 18, tuning functions 20, 22, summing function 24, and peak power reduction function 26 are considered signal processing functions, which are provided in signal processing circuitry that is represented in FIG. 1. The RF upconversion function 28 may be supported by the processing circuitry or may be provided in separate upconversion circuitry, which is considered to be represented in FIG. 1.

Figure 2:
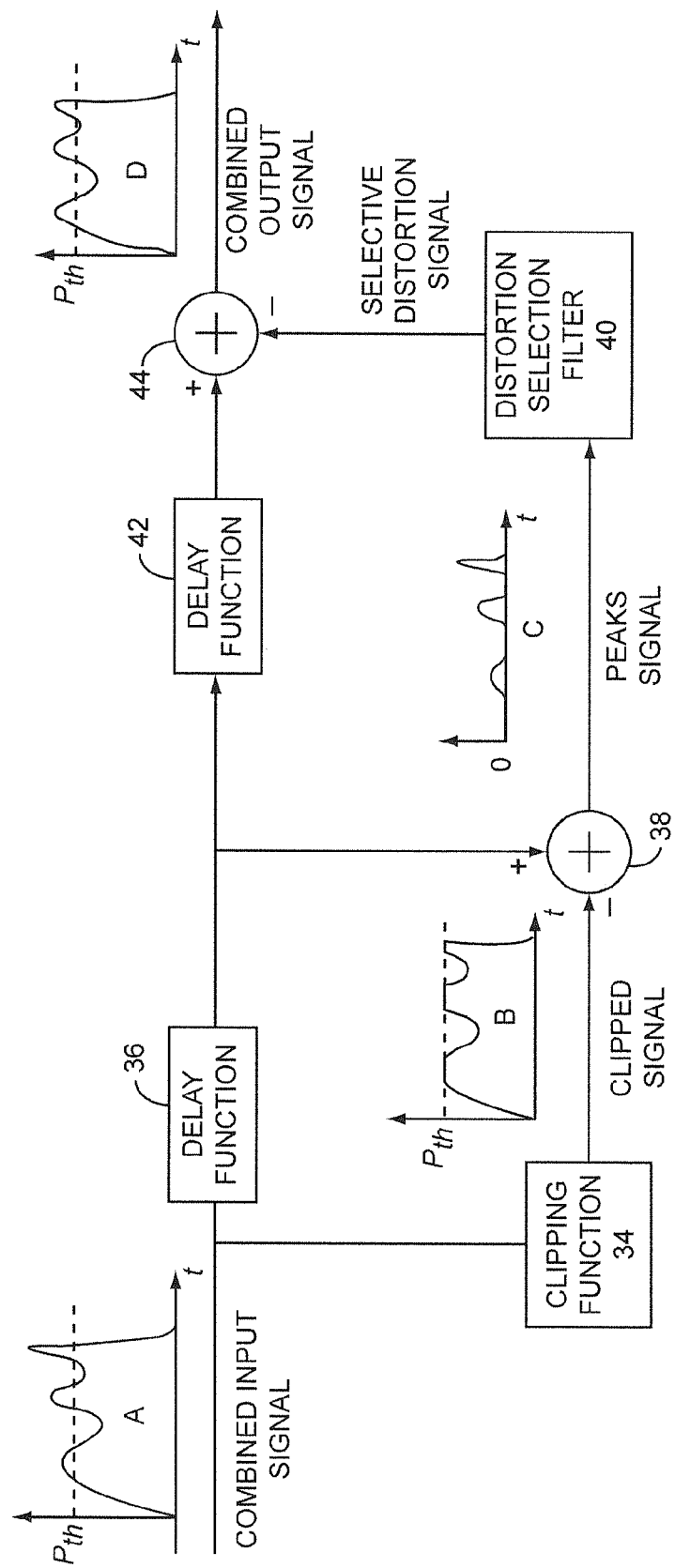
FIG. 2 is a block representation of an exemplary peak power reduction function according to one embodiment of the present invention.

In one embodiment, the peak power reduction function 26 is configured such that only selected signals in the combined input signal will receive distortion to reduce the peak power associated with the combined input signal. Preferably, the distortion that is applied to the selected signal or signals is derived from peak reduction distortion that was generated based on the overall combined input signal. As such, the peak reduction distortion of the combined input signal will have spectral content both within and outside of the frequency band in which the signal that is receiving distortion resides. Continuing with the above example and as illustrated in FIG. 2, peak reduction distortion is generated from the combined input signal A, which includes the GSM signal G and the LTE signal L, and a selected portion of the peak reduction distortion that corresponds to the frequency band of the LTE signal L is applied to the frequency band of the LTE signal L in the combined input signal.

As depicted, a time domain representation of the combined input signal A includes certain peaks that are above a defined threshold, $P_{th}$. A clipping function 34 is configured to receive the combined input signal A and clip, or remove, any peaks that exceed the defined threshold $P_{th}$ to provide a clipped signal B. The combined input signal A may be passed through a delay function 36, which provides a delay corresponding to the amount of time it takes the clipping function 34 to process the combined input signal A and provide the clipped signal B. The delayed combined input signal A and the clipped signal B are aligned in time and provided to a summing function 38, wherein the clipped signal B is subtracted, or removed, from the combined input signal A to provide a peaks signal C. The peaks signal C is effectively a signal that includes those peaks of the combined input signal A that exceed the defined threshold $P_{th}$. The peaks signal C is representative of the overall peak reduction distortion that could be applied to the combined output signal to effectively reduce those peaks that exceed the defined threshold $P_{th}$ throughout the combined input signal, including the GSM signals G and the LTE signals L.

However, as indicated above, the TDMA based GSM signals G are less tolerant to receiving peak reduction distortion than the OFDM based LTE signals L. Accordingly, a distortion selection filter 40 will have a transfer function providing a pass band for those spectral components that correspond to the frequency band in which the LTE signal L resides in the combined input signal. In other words, the distortion selection filter 40 will pass those portions of the peak reduction distortion that reside in a frequency band that contains the LTE signal L, wherein the spectral components that are passed by the distortion selection filter 40 represent a selected portion of the peak reduction distortion. The selected portion of the peak reduction distortion is provided in a selective distortion signal. Depending on the delay imposed by the distortion selection filter 40 when generating the selected distortion signal from the peaks signal C, another delay function 42 may be provided to further delay the combined input signal A, such that the combined input signal A and the selective distortion signal are aligned in time when they reach summing function 44. The selective distortion signal is subtracted from the combined input signal A to effectively apply the selected portion of the peak reduction distortion to the frequency band in which the LTE signal L resides. The resulting combined output signal D will represent a peak-reduced version of the combined input signal, wherein peak reduction distortion is selectively applied to the LTE signal L, while little or no peak reduction distortion is applied to the GSM signal G. Notably, the distortion selection filter 40 may effectively attenuate or provide gain to the selected portion of the peak reduction distortion as desired to control the extent of peak reduction that is provided when the selective distortion signal is applied to the combined input signal A. Preferably, the peak reduction process is iteratively implemented.

Figure 3A:
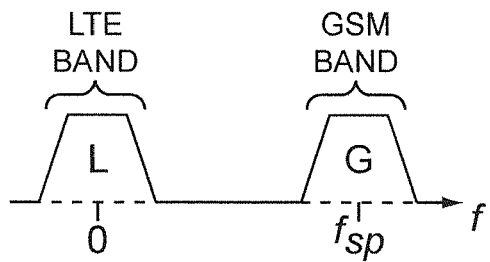
FIG. 3A illustrates a spectrum of a combined input signal according to one embodiment of the present invention.
Figure 3B:
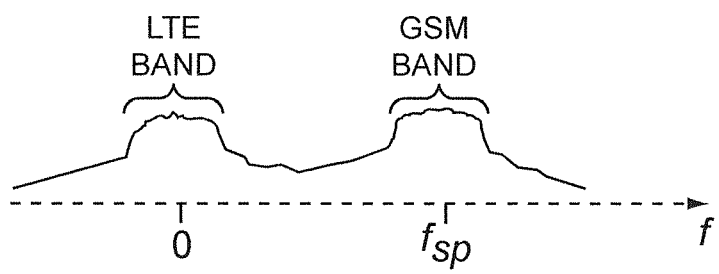
FIG. 3B illustrates a spectrum of a peaks signal according to one embodiment of the present invention.

With reference to FIGS. 3A through 3D, frequency domain representations of the spectrum of the combined input signal A (FIG. 3A); the spectrum of the peaks signal C (FIG. 3B); the transfer function of the distortion selection filter 40 (FIG. 3C); and the spectrum of the selective distortion signal (FIG. 3D) are illustrated, respectively. In FIG. 3A, the spectrum of the combined input signal A will include spectral components corresponding to the LTE signal L in an LTE band, which is located about 0 Hz, and spectral components of the GSM signal G in a GSM band, which is located about a frequency $f_{sp}$. Notably, the LTE and GSM bands represent bands at or near baseband, and do not represent the final RF frequency at which either one of the signals G, L or the combined output signal D is upconverted for transmission. As indicated, the peaks signal C, which represents the peaks of the combined input signal A that exceed the defined threshold $P_{th}$, represents peak reduction distortion for the overall combined input signal A. As such, the spectrum of the peaks signal C, as illustrated in FIG. 3B, includes spectral components in both the LTE and GSM bands, as well as between and around these bands. The spectral components are predominantly noise associated with generating the clipped signal B.

Figure 3C:
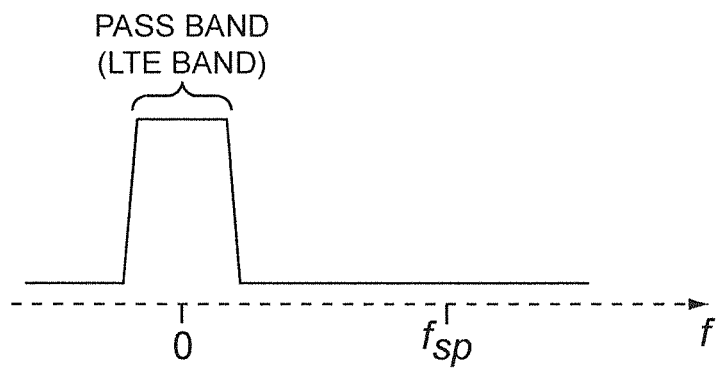
FIG. 3C illustrates a transfer function of a distortion selection filter according to one embodiment of the present invention.
Figure 3D:
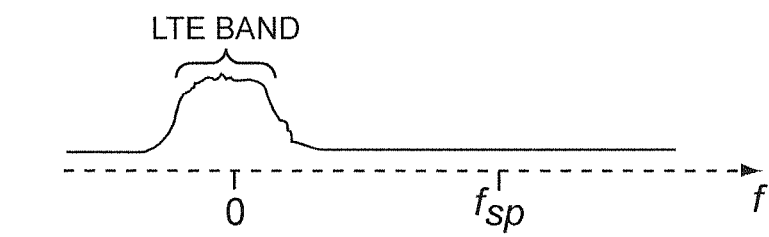
FIG. 3D illustrates a spectrum of a selective distortion signal according to one embodiment of the present invention.

An exemplary transfer function of the distortion selection filter 40 is provided in FIG. 3C. In this example, the pass band of the transfer function corresponds to the LTE band, which is the band in which the LTE signal L resides and the band in which peak reduction distortion may be applied to the combined input signal A. When the peaks signal C includes the overall peak reduction distortion, it is filtered by the distortion selection filter 40 using the transfer function of FIG. 3C. The selective distortion signal is generated with a spectrum as illustrated in FIG. 3D. Notably, the spectrum of the selective distortion signal will only include those spectral components of the peaks signal C allowed by the distortion selection filter 40 and hence contained in the LTE band. The remaining spectral components outside of the LTE band, in this example, are blocked or at least substantially attenuated to an extent wherein any remaining spectral components in the GSM band will not significantly affect the GSM signal G when the selective distortion signal is applied to the combined input signal A. Accordingly, the peak reduction distortion is selectively applied within a desired frequency band in a combined input signal.

Figure 4:
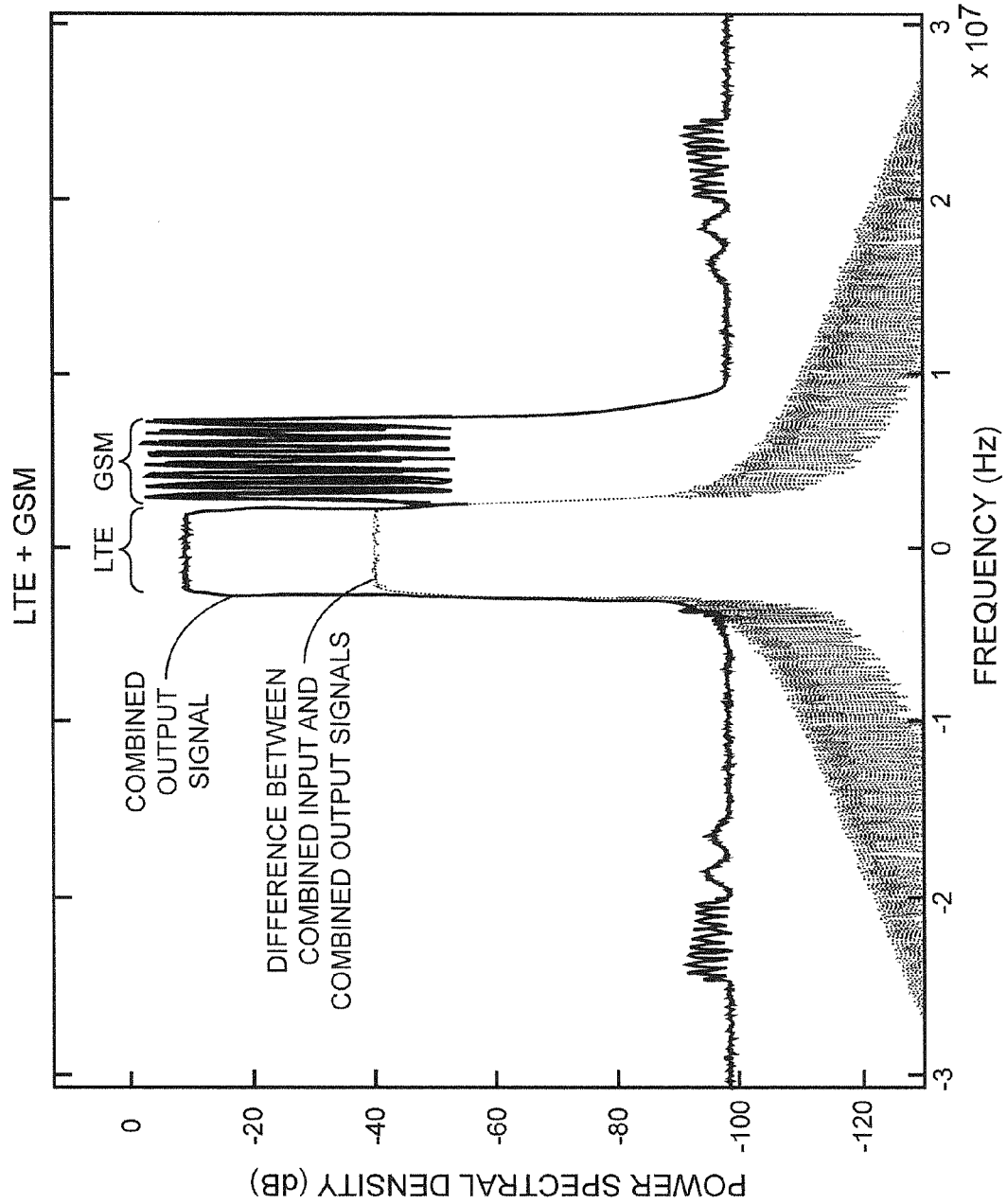
FIG. 4 is a graph illustrating power spectral densities of a combined input signal and a difference between combined input and combined output signals for a combined input signal that includes an LTE signal and a GSM signal, according to one embodiment of the present invention.
Figure 5:
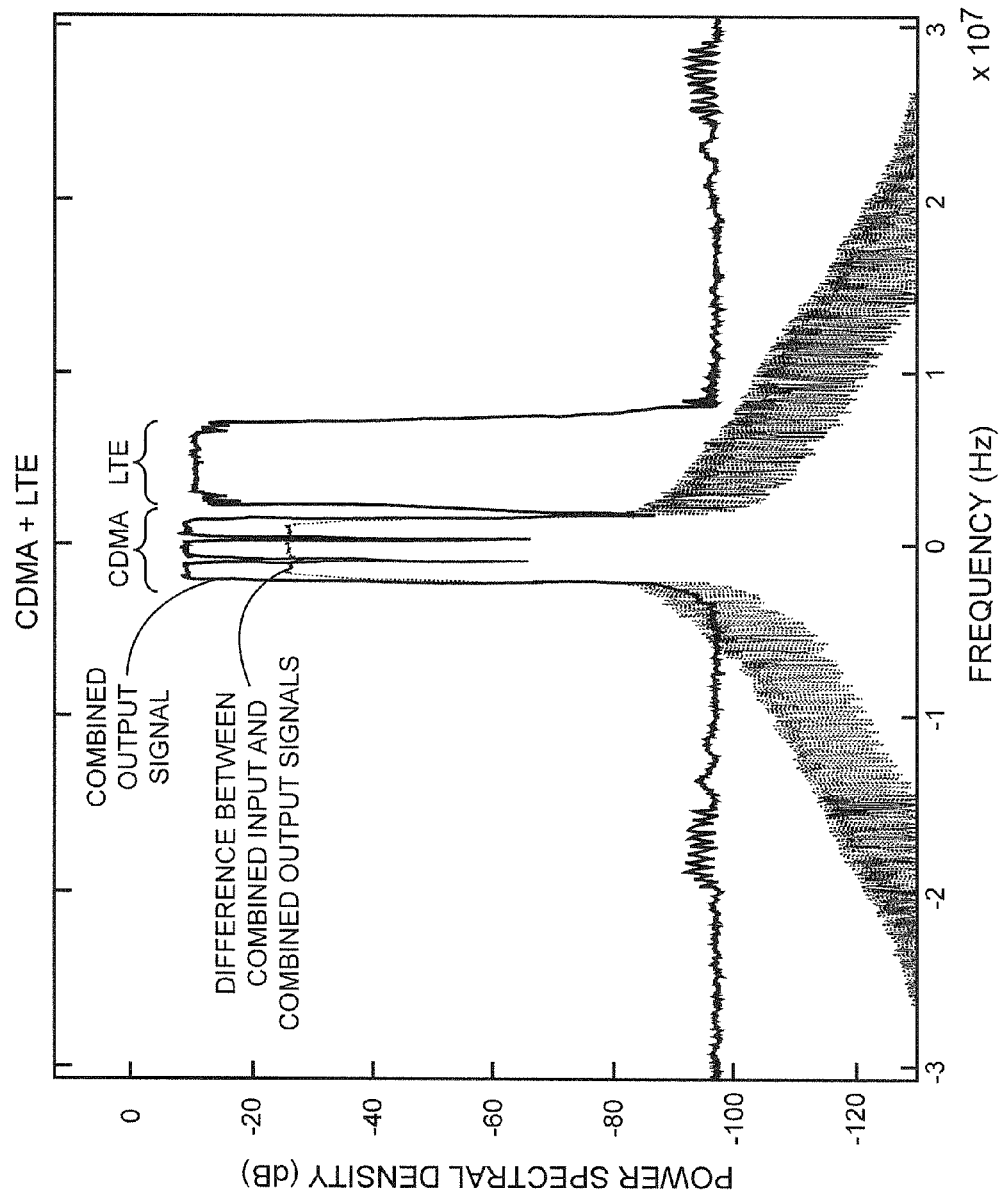
FIG. 5 is a graph illustrating power spectral densities of a combined input signal and a difference between combined input and combined output signals for a combined input signal that includes a CDMA signal and an LTE signal, according to one embodiment of the present invention.

FIGS. 4 and 5 provide graphs that plot the power spectral density in decibels (dB) of a combined input signal and a difference between a combined input signal and a peak reduced combined output signal over frequency. In FIG. 4, the combined output signal includes an LTE signal L and a GSM signal G, wherein the band for the LTE signal L is centered about 0 Hz and the band for the GSM signal G is centered about 5 MHz. The eight carrier locations illustrated in the band with the GSM signal G illustrate a time average of two GSM carriers, each of which is frequency hopped over four different frequencies. Notably, the difference between the combined input and output signals corresponds to the selective distortion signal that is applied to the combined input signal. As clearly depicted, only those spectral components of the peak reduction distortion that resides within the LTE band are applied to the combined input signal. Little or no spectral components outside of the LTE band are applied to the combined input signal, and as such, the GSM signal G within the GSM band of the combined output signal will not be affected by the peak reduction distortion that is selectively applied in the LTE band while the overall signal is peak reduced.

In FIG. 5, the combined output signal includes a CDMA signal and an LTE signal L, wherein the band for the CDMA signal is centered about 0 Hz and the band for the LTE signal L is centered about 5 MHz. Notably, the difference between the combined input and output signals corresponds to the selective distortion signal that is applied to the combined input signal. As clearly depicted, only those spectral components of the peak reduction distortion that reside within the CDMA band are applied to the combined input signal. Little or no spectral components outside of the CDMA band are applied to the combined input signal, and as such, the LTE signal L within the LTE band of the combined output signal will not be affected by the peak reduction distortion that is selectively applied in the CDMA band while the overall signal is peak reduced.

Figure 6:
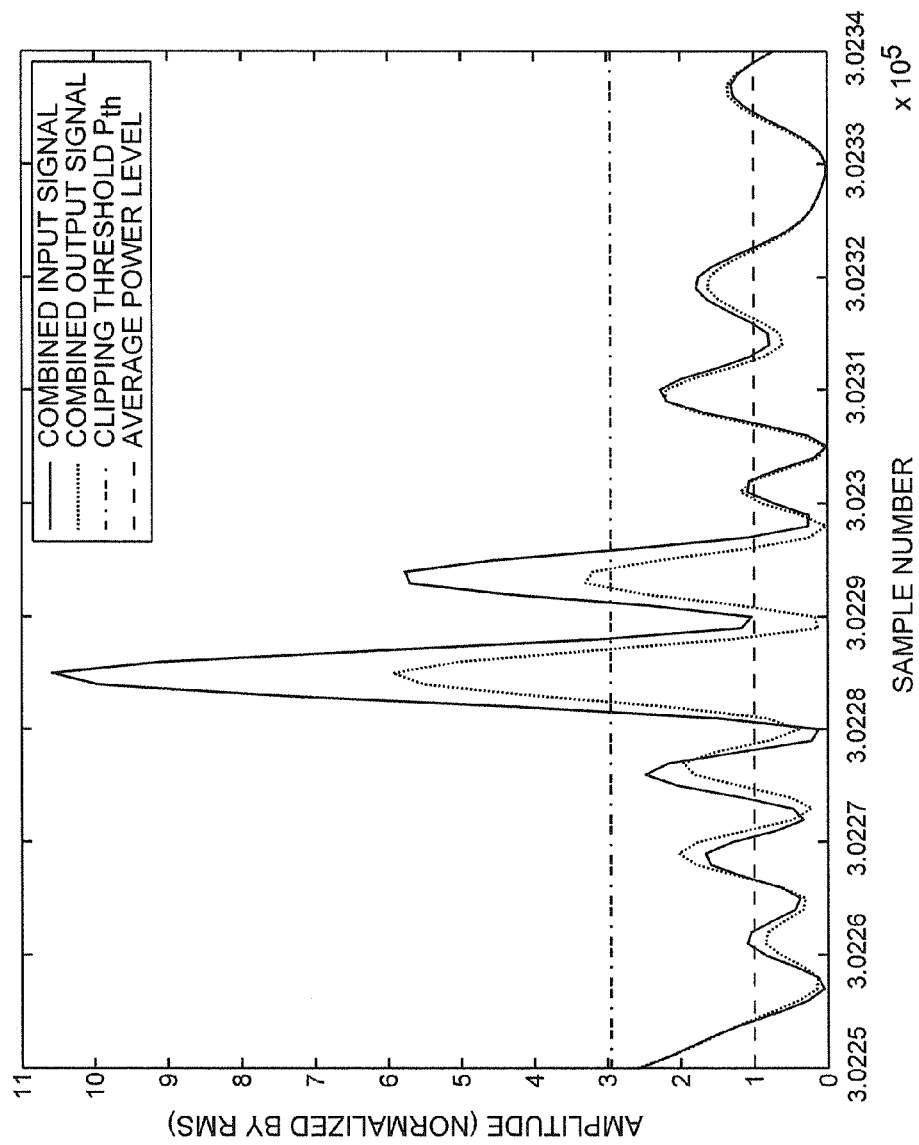
FIG. 6 illustrates a time domain response of both a combined input signal and a combined output signal according to one embodiment of the present invention.

FIG. 6 is a graph illustrating the difference between the combined input signal and the combined output signal over a few samples in the time domain, wherein the combined input signal includes a CDMA signal and an LTE signal L, such as illustrated in FIG. 5. In particular, the graph illustrates the amplitude of the samples for the respective combined input and output signals. The samples are normalized to their root mean square (RMS) values. Also illustrated is the selected clipping threshold $P_{th}$, as well as the average power level of the combined input signal. The average power level is an RMS value of the combined input signal. As is clearly shown, the selective peak power reduction provided by the present invention provides significant reduction in peak power levels.

Although the above embodiments have focused on providing two different modulated signals in a combined signal and selectively applying peak power reduction to one of the two signals, the concepts of the present invention may extend to other embodiments. For example, the combined signal may include three or more different signals, wherein selected peak reduction distortion may be selectively applied to any one or more of the respective signals. Further, the peak power reduction techniques of the present invention may be combined with other traditional peak power reduction techniques that are applied to the individual signals before they are combined to form the combined input signal.

Figure 7:
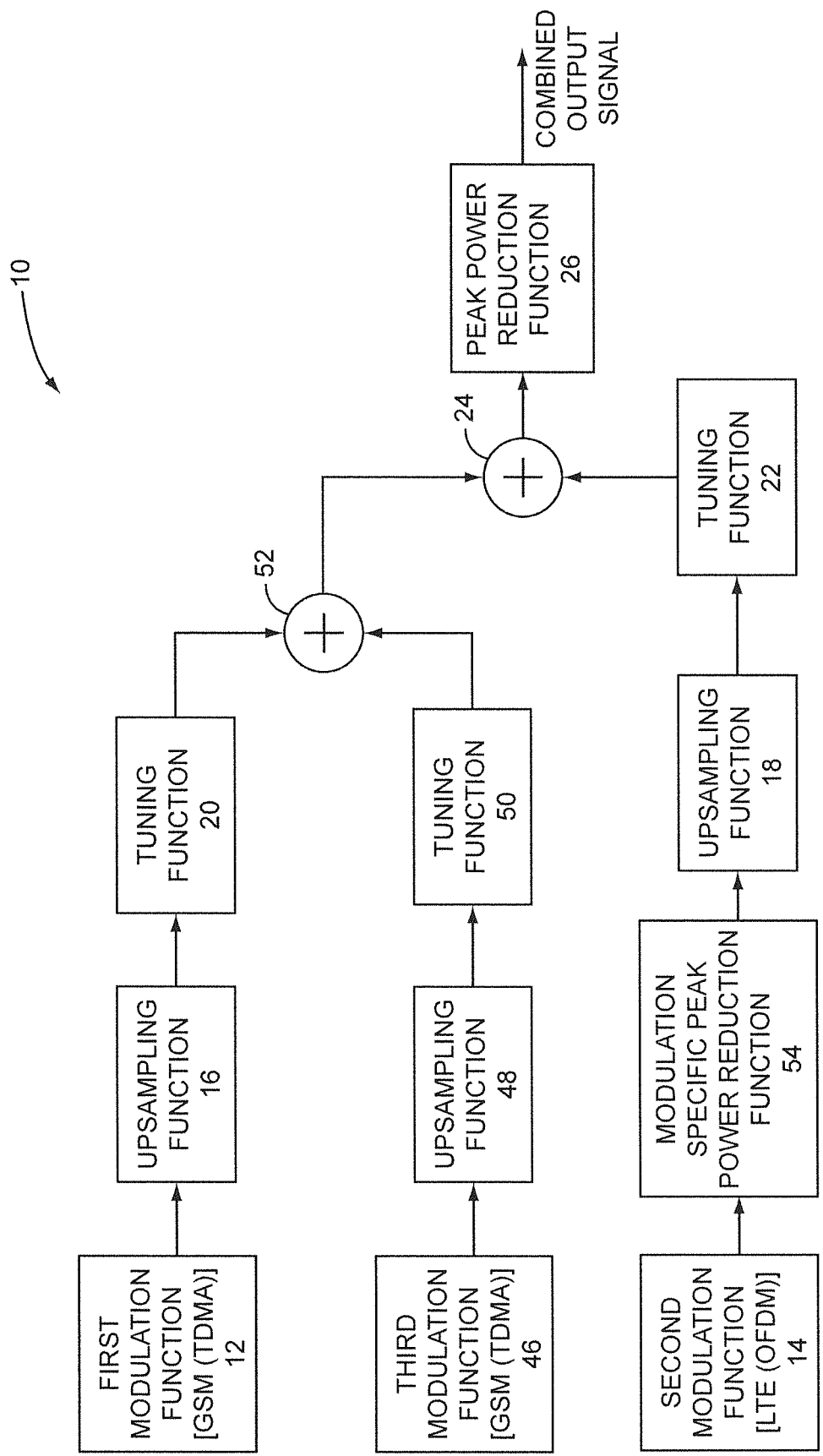
FIG. 7 is a block representation of a portion of a transmit path for a communication device according to an alternative embodiment of the present invention.

As illustrated in FIG. 7, the combined signal may include two different GSM signals G, as well as an LTE signal L. The GSM signals G may be provided in different frequency bands, and the LTE signal L may be provided in yet another frequency band that is separate from the frequency band allocated for the GSM signals G. Prior to being combined with the GSM signals G, the LTE signal L may be subjected to peak power reduction techniques that are specific to the LTE signal L. Again, although LTE and GSM signals L, G are illustrated, these various signals may represent any type of signals that employ different modulation schemes, as well as different signals within a given modulation scheme.

In this example, the first modulation function 12 will provide a first GSM signal G, which is upsampled by the upsampling function 16 to a common sampling rate. After upsampling, the first GSM signal is tuned to a first frequency band by tuning function 20. Similarly, the third modulation function 46 will provide a second GSM signal, which is upsampled, if necessary, to the common sampling rate by upsampling function 48. The second GSM signal is then tuned to a second frequency band by tuning function 50. After the first and second GSM signals G are tuned to the respective first and second frequency bands, the first and second frequency bands, the first and second GSM signals G are combined at summing circuitry 52 and presented to summing circuitry 24.

Meanwhile, the second modulation function 14 will provide an LTE signal L, which is subjected to specific peak reduction techniques by a modulation specific peak power reduction function 54. The modulation specific peak power reduction techniques may include signal distortion techniques that reduce the peak amplitudes by non-linearly distorting the signal being processed at or around those peaks that exceed a given threshold $P_{th}$. Alternatively, coding or scrambling techniques, which are known to those skilled in the art, may be employed to process the signal or the information being provided in the signal such that the processed signal will be associated with a lower peak-to-average power ratio. Exemplary peak power reduction techniques may include Amplitude Filtering and Clipping, Coding, Partial Transmit Sequence, Selected Mapping, Interleaving, Tone Reservation, Active Constellation Extension, or Tone Injection. Examples may be found in "An Overview of Peak-to-Average Power Ratio Reduction Techniques For Multicarrier Transmission," by Seung Hee Han et al., IEEE Wireless Communications, April 2005, Volume 12, Issue 2, the disclosure of which is incorporated herein by reference in its entirety. For other exemplary peak power reduction techniques, reference is made to U.S. patent application Ser. No. 12/245,047 filed on Oct. 3, 2008, International patent application number PCT/CA2008/001757 filed on Oct. 3, 2008; U.S. published patent application number 2007/0140101 published on Jun. 21, 2007; U.S. Pat. No. 7,013,161 issued on Mar. 14, 2006; U.S. Pat. No. 6,687,511 issued on Feb. 3, 2004; and U.S. Pat. No. 6,236,864 issued on May 22, 2001, the disclosures of which are incorporated herein by reference in their entireties.

The peak power reduced LTE signal is then upsampled to the common sampling rate by the upsampling function 18, and is tuned to a third frequency band by the tuning function 22. The tuned and peak power reduced LTE signal L may then be combined with the signal that includes the first and second GSM signals G at the summing function 24 to provide the combined input signal. The combined input signal is presented to the peak power reduction function 26, which will selectively apply peak power distortion as described above, in the third frequency band of the combined input signal. As such, peak power distortion that was generated based on the overall combined input signal is selectively applied to the LTE signal L in the third frequency band, while little or no peak power distortion is applied to the first and second GSM signals G in the first and second frequency bands. At this point, the LTE signal L has been subjected to peak power reduction processes at different locations. Preferably, the extent of the peak power reduction that is applied to the LTE signal L is shared between the modulation specific peak power reduction function 54 and the peak power reduction function 26. Assuming an overall distortion budget is available for the LTE signal L, the distortion budget may be partitioned between the modulation specific peak power reduction function 54 and the peak power reduction function 26 to achieve exceptional peak power reduction performance. In an exemplary embodiment for processing LTE signals, the modulation specific peak power reduction function 54 employs a symbol-based algorithm, such as METHOD AND SYSTEM FOR ADAPTIVE PEAK TO AVERAGE POWER RATIO REDUCTION IN ORTHOGONAL FREQUENCY DIVISION MULTIPLEXING COMMUNICATION NETWORKS, which is disclosed in U.S. published patent application number 2007/0140101 published on Jun. 21, 2007 and is incorporated herein by reference in its entirety.

Again, although GSM and LTE signals G, L are specifically illustrated, the different modulation functions 12, 46, 14 may employ different modulation schemes as well as provide different signals within a given modulation scheme. For example, the first and third modulation functions 12, 46 may provide LTE signals L, while the third modulation function 24 may provide a CDMA signal, wherein the modulation specific peak power reduction function 54 applies a peak power reduction technique to the individual CDMA signal, and the peak power reduction function 26 provides selective peak power reduction techniques within the frequency band of the CDMA signal to the combined input signal.

Those skilled in the art will recognize improvements and modifications to the preferred embodiments of the present invention. All such improvements and modifications are considered within the scope of the concepts disclosed herein and the claims that follow.

What is claimed is:

1. A signal processor for processing signals for application to an amplifier, the signal processor comprising:
a peak reduction distortion generation function operable to generate peak reduction distortion for a composite signal, the composite signal comprising a first signal of a first modulation type and a second signal of a second modulation type;
a peak reduction distortion modification function operable to attenuate an unselected portion of the peak reduction distortion relative to a selected portion of the peak reduction distortion to provide a modified peak reduction distortion; and
a peak reduction distortion application function operable to apply the modified peak reduction distortion to the composite signal to provide a peak reduced composite signal.

2. The signal processor of claim 1, wherein the peak reduction distortion modification function is operable to attenuate a portion of the peak reduction distortion associated with the first signal of the first modulation type relative to a portion of the peak reduction distortion associated with the second signal of the second modulation type.

3. The signal processor of claim 2, wherein:
the first signal of the first modulation type is associated with a first frequency band;
the second signal of the second modulation type is associated with a second frequency band; and
the peak reduction distortion modification function is operable to filter the peak reduction distortion to attenuate the first frequency band relative to the second frequency band.

4. The signal processor of claim 1, wherein the peak reduction distortion generation function is operable to generate peak reduction distortion comprising a signal representative of peaks in the composite signal that exceed a defined threshold.

5. The signal processor of claim 4, wherein the peak reduction distortion generation function comprises:
a clipping function operable to attenuate peaks in a first copy of the composite signal that exceed the defined threshold to provide a clipped composite signal; and a subtraction function operable to subtract the clipped composite signal from a second copy of the composite signal to provide the peak reduction distortion.

6. The signal processor of claim 5, further comprising:
a first delay operable to delay the second copy of the composite signal relative to the first copy to substantially synchronize the second copy of the composite signal with the clipped composite signal; and
a second delay operable to delay a third copy of the composite signal relative to the second copy to substantially synchronize the third copy of the composite signal with the modified peak reduction distortion for application of the modified peak reduction distortion to the third copy of the composite signal.

7. The signal processor of claim 1, further comprising a RF upconversion function operable to upconvert the peak reduced composite signal.

8. The signal processor of claim 1, wherein:
the first modulation type is one of frequency division multiple access (FDMA), orthogonal frequency division multiple access (OFDM), code division multiple access (CDMA) and time division multiple access (TDMA); and
the second modulation type is another one of frequency division multiple access (FDMA), orthogonal frequency division multiple access (OFDM), code division multiple access (CDMA) and time division multiple access (TDMA).

9. The signal processor of claim 2, wherein the first modulation type is time division multiple access and the second modulation type is orthogonal frequency division multiple access.

10. The signal processor of claim 2, wherein the first modulation type is orthogonal frequency division multiple access and the second modulation type is code division multiple access.

11. A method of operating a signal processor to process signals for application to an amplifier, the method comprising:
generating peak reduction distortion for a composite signal, the composite signal comprising a first signal of a first modulation type and a second signal of a second modulation type;
attenuating an unselected portion of the peak reduction distortion relative to a selected portion of the peak reduction distortion to provide a modified peak reduction distortion; and
applying the modified peak reduction distortion to the composite signal to provide a peak reduced composite signal.

12. The method of claim 11, wherein attenuating the unselected portion of the peak reduction distortion relative to the selected portion of the peak reduction distortion comprises attenuating a portion of the peak reduction distortion associated with the first signal of the first modulation type relative to a portion of the peak reduction distortion associated with the second signal of the second modulation type.

13. The method of claim 12, wherein:
the first signal of the first modulation type is associated with a first frequency band;
the second signal of the second modulation type is associated with a second frequency band; and
wherein the attenuating the unselected portion of the peak reduction distortion relative to the selected portion of the peak reduction distortion comprises filtering the peak reduction distortion to attenuate the first frequency band relative to the second frequency band.

14. The method of claim 11, wherein generating the peak reduction distortion comprises generating a signal representative of peaks in the composite signal that exceed a defined threshold.

15. The method of claim 14, wherein generating the peak reduction distortion comprises:
attenuating peaks in a first copy of the composite signal that exceed the defined threshold to provide a clipped composite signal; and
subtracting the clipped composite signal from a second copy of the composite signal to provide the peak reduction distortion.

16. The method of claim 15, further comprising:
delaying the second copy of the composite signal relative to the first copy to substantially synchronize the second copy of the composite signal with the clipped composite signal; and
delaying a third copy of the composite signal relative to the second copy to substantially synchronize the third copy of the composite signal with the modified peak reduction distortion for application of the modified peak reduction distortion to the third copy of the composite signal.

17. The method of claim 11, further comprising RF upconverting the peak reduced composite signal.

18. The method of claim 11, wherein:
the first modulation type is one of frequency division multiple access (FDMA), orthogonal frequency division multiple access (OFDM), code division multiple access (CDMA) and time division multiple access (TDMA); and
the second modulation type is another one of frequency division multiple access (FDMA), orthogonal frequency division multiple access (OFDM), code division multiple access (CDMA) and time division multiple access (TDMA).

19. The method of claim 12, wherein the first modulation type is time division multiple access and the second modulation type is orthogonal frequency division multiple access.

20. The method of claim 12, wherein the first modulation type is orthogonal frequency division multiple access and the second modulation type is code division multiple access.

* * * * *